United States Patent
Dessouki et al.

(10) Patent No.: US 8,000,870 B2
(45) Date of Patent: Aug. 16, 2011

(54) ACTIVE BRAKE PULSATION CONTROL

(75) Inventors: Omar S. Dessouki, Beverly Hills, MI (US); Brent D. Lowe, Milford, MI (US); Mark T. Riefe, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1022 days.

(21) Appl. No.: 11/844,369

(22) Filed: Aug. 24, 2007

(65) Prior Publication Data
US 2009/0055065 A1   Feb. 26, 2009

(51) Int. Cl.
*B60T 7/00* (2006.01)

(52) U.S. Cl. ............... 701/70; 188/106 R; 188/151 R; 188/152; 303/3; 303/10; 303/11; 303/16; 303/19; 303/20; 303/22.1; 303/22.5; 303/28; 303/68; 303/71; 303/77; 701/29; 701/36; 701/48; 701/71; 701/78; 701/83

(58) Field of Classification Search .......... 701/1, 29–40, 701/48, 70–83, 91
See application file for complete search history.

(56) References Cited

U.S. PATENT DOCUMENTS

| | | | | |
|---|---|---|---|---|
| 4,370,714 A * | 1/1983 | Rettich et al. | ........ | 701/70 |
| 4,402,047 A * | 8/1983 | Newton et al. | ........ | 701/70 |
| 4,865,395 A * | 9/1989 | Fukushima | ........ | 303/87 |
| 4,957,330 A * | 9/1990 | Morikawa et al. | ........ | 303/115.4 |
| 5,088,042 A * | 2/1992 | Brearley et al. | ........ | 701/70 |
| 5,161,864 A * | 11/1992 | Cardenas et al. | ........ | 303/87 |
| 5,205,309 A * | 4/1993 | Cardenas et al. | ........ | 137/1 |
| 5,207,486 A * | 5/1993 | Tanaka | ........ | 303/113.2 |
| 5,222,787 A * | 6/1993 | Eddy et al. | ........ | 303/10 |
| 5,380,074 A * | 1/1995 | Jones | ........ | 303/87 |
| 5,403,072 A * | 4/1995 | Kilian et al. | ........ | 303/3 |
| 5,567,022 A * | 10/1996 | Linkner, Jr. | ........ | 303/87 |
| 5,646,848 A * | 7/1997 | Walenty et al. | ........ | 701/70 |
| 6,003,961 A * | 12/1999 | Binder et al. | ........ | 303/191 |
| 6,047,794 A * | 4/2000 | Nishizawa | ........ | 188/73.36 |
| 6,182,001 B1 * | 1/2001 | Sugai et al. | ........ | 701/78 |
| 6,266,602 B1 * | 7/2001 | Yamaura | ........ | 701/80 |
| 6,322,160 B1 * | 11/2001 | Loh et al. | ........ | 303/87 |
| 6,328,390 B1 * | 12/2001 | Tozu et al. | ........ | 303/113.5 |
| 6,378,669 B1 * | 4/2002 | Kurasako et al. | ........ | 188/218 XL |
| 6,412,881 B1 * | 7/2002 | Isono | ........ | 303/114.1 |
| 6,487,487 B2 * | 11/2002 | Kesselgruber | ........ | 701/70 |
| 6,533,366 B1 * | 3/2003 | Barron et al. | ........ | 303/113.1 |
| 6,607,252 B2 * | 8/2003 | Weng et al. | ........ | 303/87 |
| 6,671,604 B1 * | 12/2003 | Frentz et al. | ........ | 701/70 |
| 7,448,701 B2 * | 11/2008 | Nilsson et al. | ........ | 303/167 |

(Continued)

FOREIGN PATENT DOCUMENTS

DE    10312545 A1    10/2004

(Continued)

*Primary Examiner* — Jack Keith
*Assistant Examiner* — Jonathan M Dager
(74) *Attorney, Agent, or Firm* — Quinn Law Group, PLLC

(57) ABSTRACT

A brake system is provided for minimizing brake pulsation feedback caused by surface variations of a brake system corner component. The brake system includes at least one sensing device configured to measure a pressure pulse caused by the surface variation of a brake system corner component. A controller module is in communication with the at least one sensing device and a hydraulic brake circuit. The controller module is configured to receive an output from the at least one sensing device and to adjust line pressure in the hydraulic brake circuit to substantially minimize brake pulsation feedback.

20 Claims, 4 Drawing Sheets

U.S. PATENT DOCUMENTS

| | | | |
|---|---|---|---|
| 7,503,436 B2* | 3/2009 | Matsuura et al. | 188/1.11 E |
| 7,695,075 B1* | 4/2010 | Mackiewicz | 303/191 |
| 2001/0049577 A1* | 12/2001 | Kesselgruber | 701/70 |
| 2002/0027387 A1* | 3/2002 | Kubota | 303/20 |
| 2002/0029939 A1* | 3/2002 | Bunker | 188/18 A |
| 2003/0042791 A1* | 3/2003 | Weng et al. | 303/194 |
| 2003/0125863 A1* | 7/2003 | Tamasho et al. | 701/70 |
| 2004/0232764 A1* | 11/2004 | Schafiyha et al. | 303/139 |
| 2005/0261818 A1* | 11/2005 | Brown et al. | 701/70 |
| 2006/0266598 A1* | 11/2006 | Baumgartner et al. | 188/72.7 |
| 2006/0272904 A1* | 12/2006 | Soellner | 188/71.7 |
| 2007/0235268 A1* | 10/2007 | Caron | 188/71.8 |
| 2007/0256901 A1* | 11/2007 | Niehorster et al. | 188/71.7 |
| 2008/0116742 A1* | 5/2008 | Lipski | 303/87 |
| 2008/0122287 A1* | 5/2008 | Wei et al. | 303/116.1 |

FOREIGN PATENT DOCUMENTS

EP    1157908 A1    11/2001

* cited by examiner

ACTIVE BRAKE PULSATION CONTROL

TECHNICAL FIELD

The present invention generally relates to control systems installed in automobiles and other vehicles, and more particularly relates to methods and systems for controlling brake line pressure to minimize tactile feedback caused by surface variations of a brake system corner component.

BACKGROUND OF THE INVENTION

Brake systems for most modern vehicles consist of disc brakes, drum brakes or a combination of the two systems. An example of a disc brake system is a single-piston floating caliper (SPFC) system. The main brake corner components of a SPFC disc brake system are the brake pads, the caliper, the rotor, and the hydraulic brake circuit. The rotor is a plate-like disc that is configured to attach to, and rotates with, the hub of the vehicle wheel. The caliper is mounted adjacent the peripheral edge of the rotor and houses the brake pads and a single piston that is actuated by hydraulic pressure via the hydraulic brake circuit. When the brake pedal is pushed, hydraulic pressure increases and forces the piston of the caliper to extend outwardly. The extended piston causes the brake pads to be squeezed against both sides of the rotor whereby friction between the components bring the vehicle wheel to a stop.

Although similar in function to the disc brake system, a drum brake system utilizes different brake corner components which include, among other things, brake shoes instead of brake pads and a drum instead of a rotor. The drum is a bowl-like component that attaches to, and rotates with, the vehicle wheel. The brakes shoes are mounted inside of, and adjacent to, the walls that extend substantially perpendicular from the base of the drum. When the brake pedal of the vehicle is pushed, hydraulic pressure in the hydraulic brake circuit is increased. In response to the increased hydraulic pressure, a piston forces the brake shoes outward to engage the inside surface of the drum walls whereby friction between the components bring the vehicle wheel to a stop.

Brake pulsation feedback is an effect caused by a fluctuation in brake torque due to brake system corner component surface variations commonly referred to as Rotor Thickness Variation (RTV) and/or Drum Roundness Variation (DRV). Both RTV and DRV are frequently the result of variations in machining procedures but can also be caused by uneven wear of brake pads or shoes, corrosion, loose brake parts and/or uneven thermal expansion of brake corner components. The fluctuation in brake torque can also be a result of a non-uniform friction or frictional variations on the braking surface (non-uniform transfer film on the braking surface).

If the vehicle is equipped with an Anti-Lock Brake System (ABS), however, brake pulsation feedback and noise are normal during panic stops or when braking on wet or slick surfaces. But ABS brake pulsation feedback when braking normally on dry pavement does not occur. Accordingly, occurrence of such feedback during normal braking of an ABS-equipped vehicle could be indicative of a corner component having RTV or DRV.

If the vehicle has an Electro-Hydraulic Brake (EHB) system, it may utilize an Electro-Hydraulic Control (EHC) module rather than ABS module to control vehicle stopping. The EHB system eliminates the physical connection between the brake pedal and the hydraulic brake circuit. In such case, brake pulsation feedback due to RTV or DRV is noticeable through vehicle components other than the brake pedal such as the vehicle steering wheel, seats or other components.

In either case, brake pulsation feedback can be annoying to the driver of the vehicle, resulting in customer dissatisfaction and increased warranty claims. Additionally, efforts to eliminate brake pulsation feedback may be costly and time consuming, ranging from having to "turn" the rotors and/or drums to smooth the surfaces thereof, to having these components replaced altogether with the brake pads and shoes. Accordingly, it is desirable to have a brake system and method for minimizing brake pulsation feedback that occurs as a result of surface variations in brake system corner components.

SUMMARY OF THE INVENTION

A brake system is provided for minimizing brake pulsation feedback caused by surface variations of a brake system corner component such as a brake rotor or drum. The brake system includes at least one sensing device configured to measure a pressure pulse caused by the surface variation of the brake system corner component.

A controller module is in communication with the at least one sensing device and a hydraulic brake circuit. The controller module is configured to increase or decrease line pressure in the hydraulic brake circuit by an amount that is equal in magnitude and out-of-phase with the pressure pulse caused by the surface variation of the brake system corner component to substantially minimize brake pulsation feedback.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
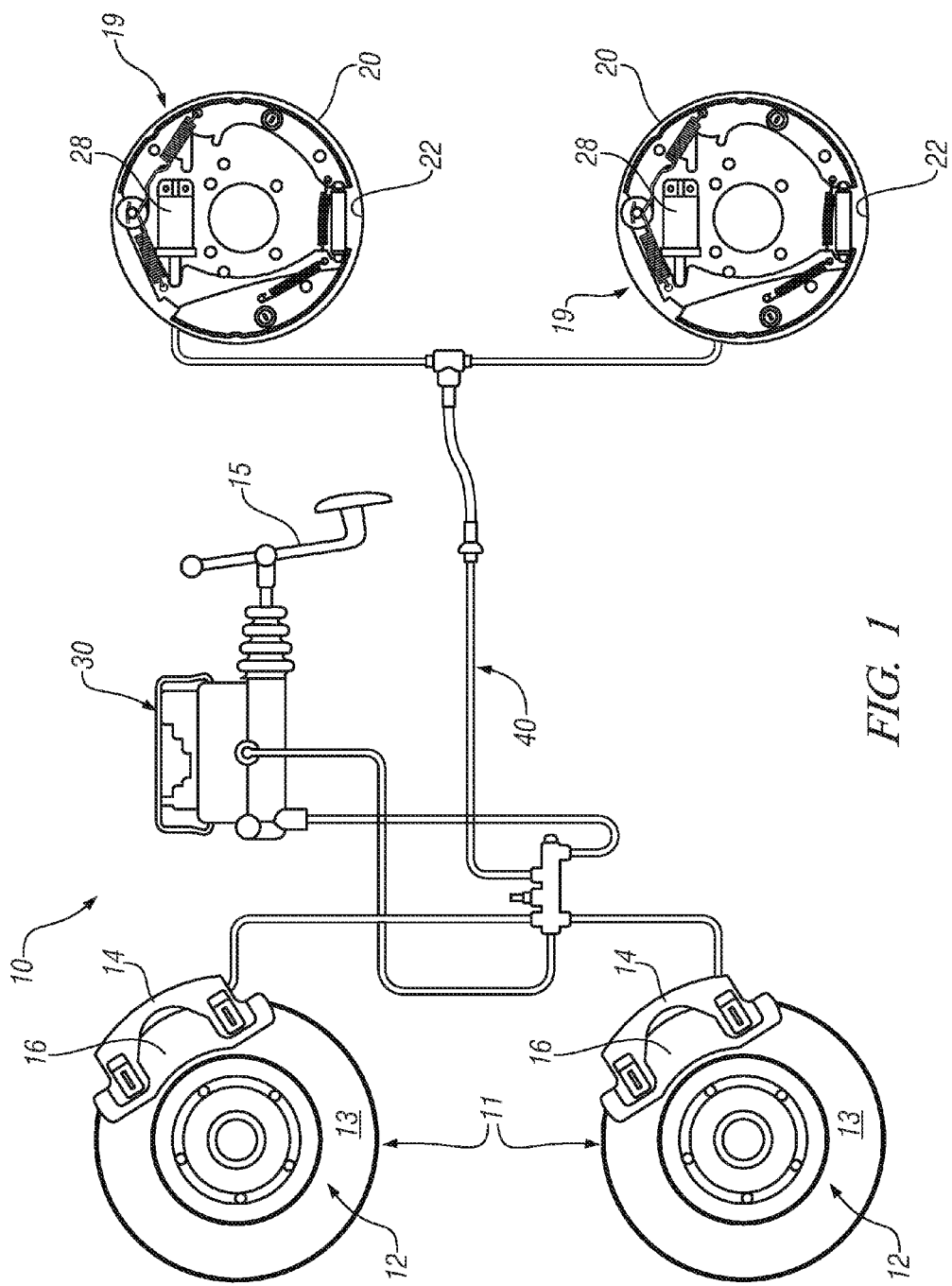
FIG. 1 illustrates a vehicle braking system.

FIG. 1 is a perspective view of an exemplary vehicle braking system 10 for minimizing brake pulsation feedback caused by a surface variation of a braking system corner component. The braking system 10 includes disc brake corner components 11 and brake shoe corner components 19.

The disc brake corner components 11 include a rotor 12, a brake caliper 14, brake pads 16 and a wheel speed sensor 38

Figure 2A:
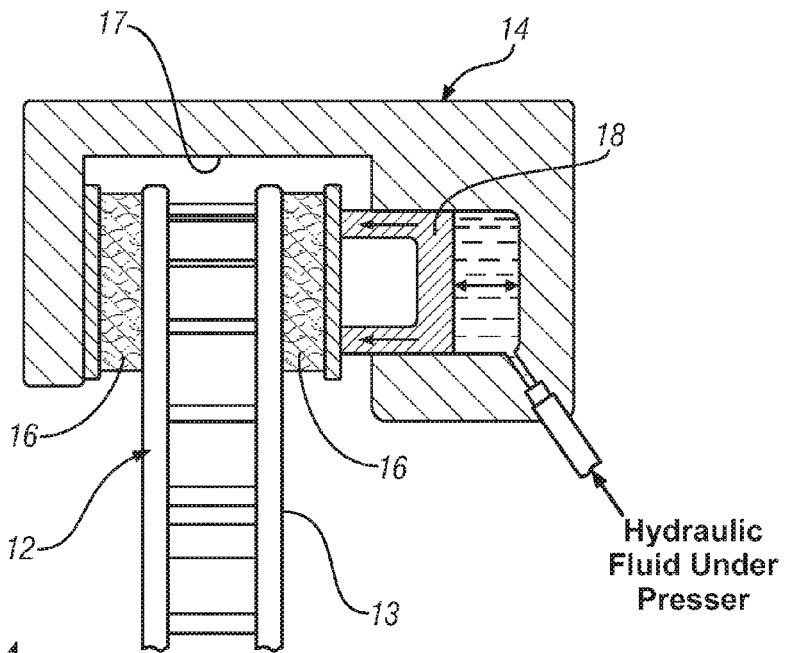
FIG. 2A illustrates a cross-sectional view of a disc brake system corner of FIG. 1.
Figure 3:
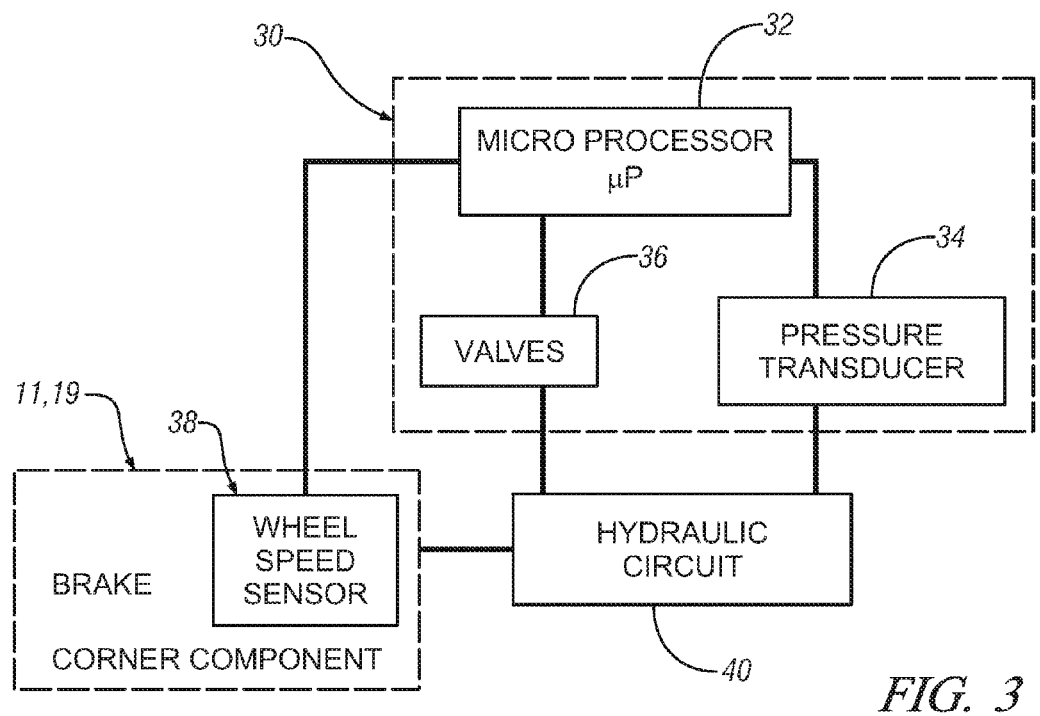
FIG. 3 illustrates a functional block diagram of the vehicle braking system of FIG. 1.

(see FIG. 3). The rotor 12 is a plate-like component that attaches to the wheel of the vehicle and includes opposing planar contact surfaces 13 (see FIG. 2A). The brake caliper 14 is a generally U-shaped device that includes a longitudinally bisecting channel 17 and at least one piston 18. The bisecting channel 17 is configured to allow the brake caliper 14 to be mounted about the peripheral edge of the rotor 12.

The brake caliper 14 also houses brake pads 16 which are arranged in the bisecting channel 17 such that contact can be made with the opposing planar surfaces 13 of the rotor 12 during a braking event. When the vehicle is in motion, the rotor 12 spins with the wheel. When the brake pedal 15 is pressed, hydraulic pressure within the hydraulic brake circuit 40 increases which causes the piston 18 in the brake caliper 14 to squeeze the brake pads 16 against the opposing planar surfaces 13 of the rotor 12. The friction generated between the brake pads 16 and the opposing planar contact surfaces 13 of rotor 12 causes the vehicle wheel to stop rotating.

Figure 2B:
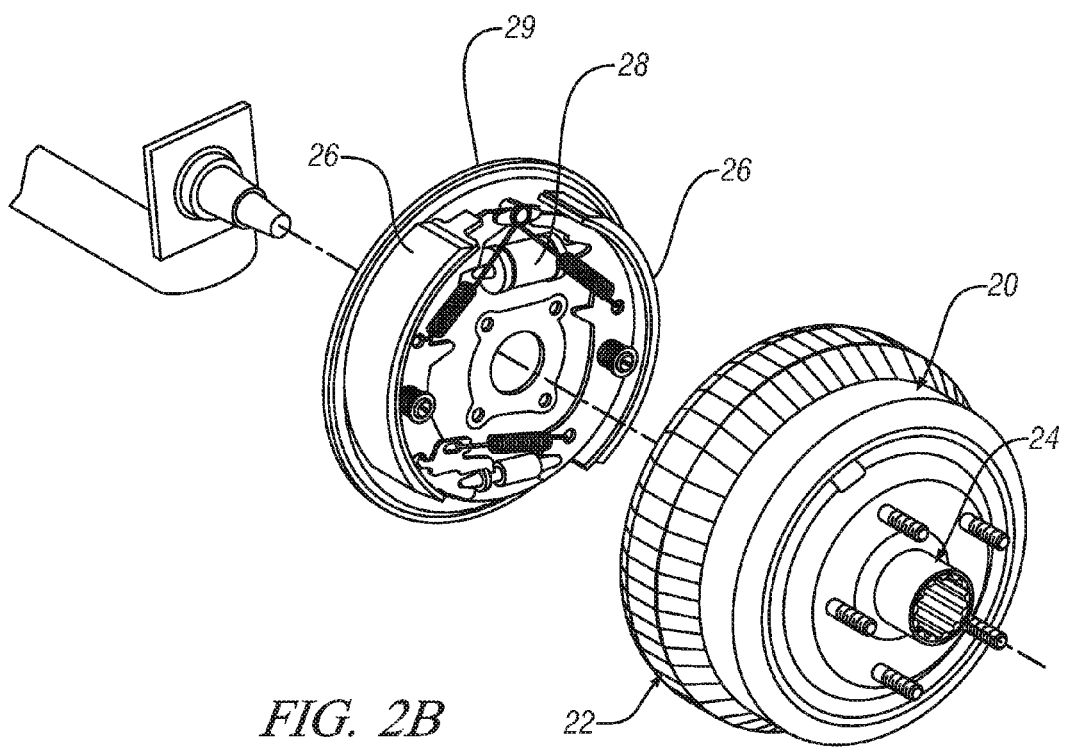
FIG. 2B illustrates a partially exploded view of a brake shoe corner component.

Brake shoe corner components 19 include, among other things, a brake drum 20, brake shoes 26 and a piston 28. The brake drum 20 is a bowl-like component having a base 24 from which walls 22 extend substantially perpendicular thereto (see FIG. 2B). The brake shoes 26 are mounted to a backing plate 29 such that at least one end of each brake shoe 26 engages the piston 28. The brake drum 20 is mounted over the brake shoes 26 such that the working surface of each brake shoe 26 is in a position to engage the walls 22 of the brake drum 20. The brake drum 20 attaches to the vehicle and rotates with the wheel. When the brake pedal 15 is pressed, pressure increases in the hydraulic brake circuit 40 which causes the piston 28 to force the brake shoes 26 against the walls 22 of the brake drum 20. Friction between the brake shoes 26 and walls 22 causes the vehicle wheel to stop rotating.

Referring to FIG. 3, the brake system 10 for minimizing brake pulsation feedback includes a control module 30, a microprocessor 32, a pressure transducer 34, valves 36, a wheel speed sensor 38 in communication with brake corner components (11, 19), and a hydraulic brake circuit 40.

The control module 30 for the braking system 10 may be an Anti-Lock Brake System (ABS) controller, an Electro-Hydraulic Controller (EHC), or any other vehicle controller configured to provide the control for minimizing brake pulsation feedback as according to the invention. In an embodiment, the control module 30 contains, among other things, the microprocessor 32, pressure transducer 34, and valves 36.

The microprocessor 32 is a computer processor on a microchip sometimes called a logic chip. A microprocessor 32 is designed to perform arithmetic and logic operations that make use of data memory areas called registers. Microprocessors are configured to perform mathematical operations from a set of programming instructions that are stored in the microprocessor memory. Such operations preferably include, but not limited to, calculating pressure pulse magnitude and phase based on inputs received from at least one sensing device associated with the vehicle, e.g., pressure transducer and/or wheel speed sensor.

Each corner component communicates with at least one sensing device configured to measure the magnitude and phase of a pressure pulse caused by RTV and/or DRV. Devices suitable for measuring the magnitude and phase of the pressure pulse caused by RTV and/or DRV may illustratively include, pressure transducers, wheel speed sensors, optical sensors, inertia sensors, decelerometers, and strain gaged calipers.

With reference to FIG. 3, pressure transducer 34 is typically configured to output an electrical signal that relates to a pressure level so that a pressure scale can be made for converting the electrical signal values to pressure values, e.g., 1 mv/1 psi. The detecting element of a pressure transducer is commonly a strain gauge; that is, a resistive element whose resistance changes with the amount of strain/pressure placed on it. As the resistance changes, so does an electrical signal output from the pressure transducer. The electrical signal output from the pressure transducer is received by the microprocessor 32 and preferably used to determine the magnitude and phase of a pressure pulse (electrical signal) caused by a RTV and/or DRV. As illustrated in FIG. 3, the pressure transducer 34 is contained within the control module 30 but this is not intended to be limiting as the pressure transducer 34 may be located in close proximity to the brake corner component or at another location within the brake system 10.

The brake system 10 as according to the invention includes at least one valve 36 for each brake corner component (11, 19) located in the hydraulic circuit 40 of the brake system 10. In an embodiment, each valve 36 has three positions. In position one, the valve is open; pressure from the master cylinder (not shown) is passed right through to the brake corner component (11, 19) to cause an increase in line pressure. In position two, the valve 36 blocks the line, isolating that brake corner component from the master cylinder. This prevents the pressure from rising further should the driver push the brake pedal harder. In position three, the valve 36 adjusts to release some of the pressure from the brake corner component (11, 19) to decrease line pressure. The independent operation of each valve is controlled by the microprocessor 32. For example, the microprocessor 32 can open a valve 36 to increase line pressure to the left-front brake corner component while simultaneously controlling another valve 36 to block the line to the right-front brake corner component to maintain constant line pressure.

Wheel speed sensors are configured to measure the speed, position and change in speed of the vehicle wheel but can also be used to measure its phase angle, i.e., from 0 to 360 degrees. An exemplary wheel speed sensor includes a permanent magnet and a coil with core material disposed in a suitable housing. The wheel speed sensor is typically mounted in close proximity to a metallic toothed component at the vehicle wheel, e.g., the rotor. As each tooth moves by the wheel speed sensor 38 an electrical pulse is induced in the coil. The microprocessor 32 is in communication with the wheel speed sensor 38 and is configured to receive the electrical pulse and calculate the phase angle of the vehicle wheel rotation from a zero (0) degree reference point. Other sensors suitable for determining speed, position and phase of a pressure pulse may include, but not limited to, a transmission vehicle speed sensor and a Global Positioning Sensor (GPS).

The phase angle of the pressure pulse determines whether line pressure will be increased or decreased as according to the invention. For example, if the phase angle of the pressure pulse is positive, i.e., between 0 and 180 degrees, then the microprocessor 32 will decrease line pressure by an amount equal to the magnitude of the pressure pulse but substantially opposite or 180 degrees out-of-phase therewith. Correspondingly, if the phase angle of the pressure pulse is negative, i.e., between 180 and 360 degrees, then the microprocessor 32 will increase line pressure by an amount equal to the magnitude of the pressure pulse but substantially opposite or 180 degrees out-of-phase therewith. Accordingly, because the change in line pressure occurs substantially simultaneously with the pressure pulse, but opposite or substantially 180 degrees out-of-phase therewith, the brake pulsation feedback is minimized. It is appreciated that maximum minimization of brake pulsation feedback occurs when the line pressure change occurs substantially simultaneously, and substantially 180 degrees out-of phase, with the pressure pulse. However, it is also appreciated that other magnitude and phase angle relationships between the pressure pulse and the line pressure may be used to cause a less than maximum minimizing effect on brake pulsation feedback without exceeding the scope of the invention.

Figure 4A:
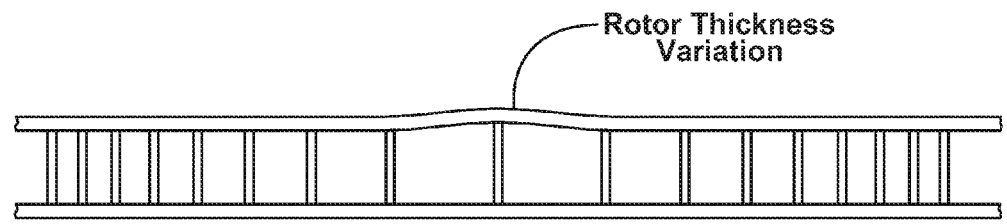
FIG. 4A illustrates a fragmented view of an example of brake rotor thickness variation.
Figure 4B:
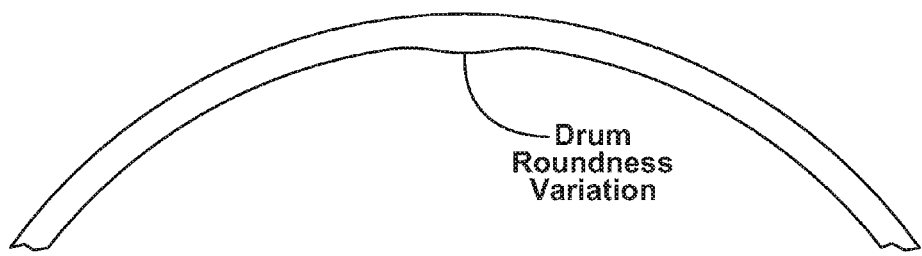
FIG. 4B illustrates a fragmented view of an example of brake drum roundness variation.

FIGS. 4A and 4B illustrate examples of RTV and DRV, respectively. As described above, RTV and DRV are frequently the result of variations in machining procedures but can also be caused by uneven wear of brake pads or shoes, corrosion, loose brake parts and/or uneven thermal expansion of brake corner components.

During a braking event, brake line pressure varies in accordance with the brake pads 16 and/or brake shoes 26 contacting RTV and/or DRV on the surfaces of the corner components as the vehicle wheel rotates. These pressure variations, or brake pulsations, are typically noticeable in the brake pedal, steering wheel, seat or other components of the vehicle. Conventional repair methods include machining the surfaces of the corner components to eliminate the variations or simply replacing the corner components. In an embodiment of the present invention, the effects of RTV and DRV are minimized without the need for machining or replacing these corner components.

Figure 5:
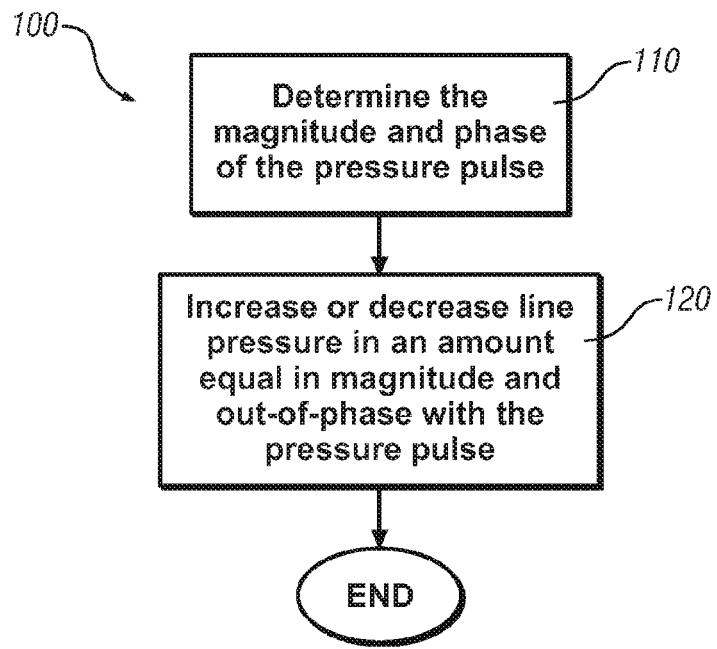
FIG. 5 illustrates a process diagram of a method for minimizing brake pulsation feedback caused by RTV and/or DRV.

As according to an embodiment, a method 100 for minimizing brake pulsation feedback caused by a surface variation in a corner component connected to the hydraulic brake circuit of a brake system is illustrated in FIG. 5.

At step 110, the method begins by determining the magnitude and phase of a pressure pulse caused by the surface variation of the brake corner component. The method advances to step 120.

At step 120, the brake system responds to the pressure pulse by increasing or decreasing line pressure in the hydraulic brake circuit by an amount equal in magnitude and out-of-phase with the pressure pulse to substantially minimize brake pulsation feedback.

As briefly described above, at least one sensor is used to detect the pressure pulse caused by the RTV and/or DRV on the surface of the corner component. The at least one sensor outputs an electrical signal to the microprocessor for determining the magnitude and phase of the pressure pulse. The microprocessor then actuates the valves to substantially minimize brake pulsation feedback by increasing or decreasing line pressure in an amount equal in magnitude and out-of-phase with the pressure pulse.

Figure 6:
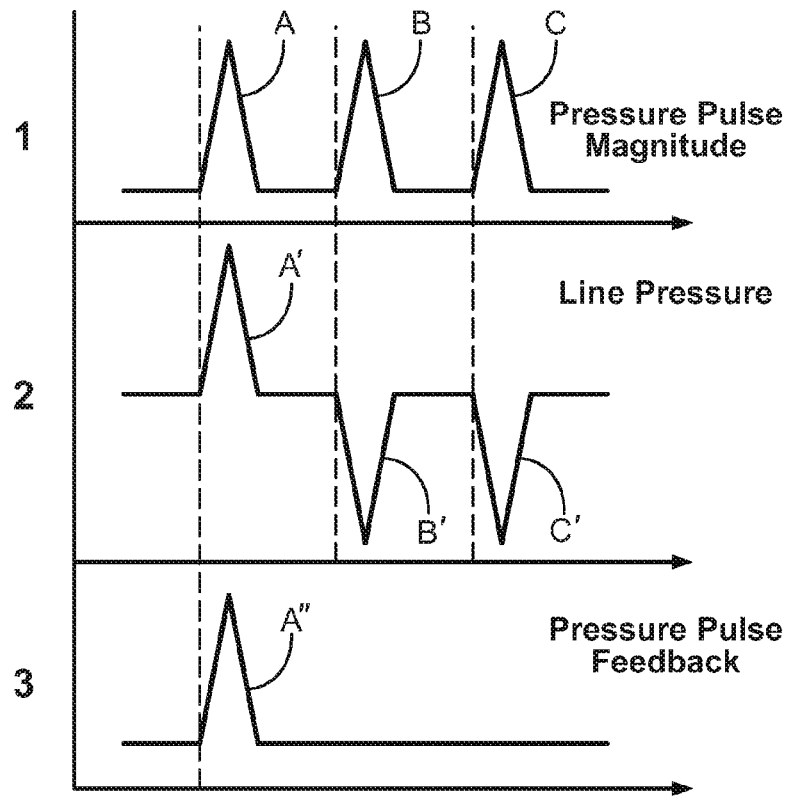
FIG. 6 illustrates an example of a pulse signal diagram of a pressure pulse magnitude, line pressure pulse, and pressure pulse feedback as according to the invention.

FIG. 6 illustrates an example of a pressure pulse diagrams that occur in response to a RTV or DRV in the brake system as according to the invention. The first, second and third pulse diagrams illustrate the magnitude of the pressure pulse, the line pressure, and the pressure pulse feedback, respectively.

When the first pressure pulse (A) occurs, the change in line pressure (A') and the pressure pulse feedback (A") occur likewise. From this occurrence, the control module learns the magnitude and phase of the pressure pulse. When the subsequent pressure pulses occur, e.g., pulses (B) and (C), the microprocessor actuates at least one valve to substantially simultaneously reduce line pressure (B') and (C') in an amount equal in magnitude and substantially 180 degrees out-of-phase with the subsequent pressure pulses. It is appreciated that the microprocessor 32 controls the valve actuation for each corner component (11, 19) independently. Accordingly, one or all of the corner components (11, 19) may have RTV or DRV which are detected and minimized by the brake system 10 as according to the invention. The result is that the pressure pulse feedback is substantially minimized without the need for conventional repair methods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A brake system for minimizing a brake pulsation feedback caused by a surface variation of a brake system corner component, said brake system comprising:
    at least one sensing device configured to measure magnitude and phase of a pressure pulse caused by the surface variation; and
    a controller module in communication with said at least one sensing device and a hydraulic brake circuit, said controller module being configured to command line pressure in the hydraulic brake circuit to increase or decrease by an amount that is equal in magnitude and substantially opposite to the pressure pulse caused by the surface variation of the brake system corner component to substantially minimize brake pulsation feedback.

2. The brake system of claim 1 wherein said at least one sensing device is a pressure transducer.

3. The brake system of claim 1 wherein said controller module is an anti-lock brake system (ABS) module.

4. The brake system of claim 1 wherein said controller module is an electro-hydraulic control (EHC) module.

5. The brake system of claim 1 wherein the brake system corner component is a brake rotor.

6. The brake system of claim 1 wherein the brake system corner component is a brake drum.

7. The brake system of claim 1 wherein the brake system corner component is a brake pad.

8. The brake system of claim 1 wherein the brake system corner component is a brake shoe.

9. The brake system of claim 1 wherein said controller module further comprises at least one valve for regulating hydraulic fluid flow through the hydraulic brake circuit.

10. The brake system of claim 9 wherein said controller module opens and closes said at least one valve to regulate line pressure in response to the pressure pulse.

11. A brake system for minimizing a brake pulsation feedback caused by a surface variation of a brake system corner component, said brake system comprising:
    a first sensing device configured to measure magnitude of a pressure pulse;
    a second sensing device configured to measure phase of the pressure pulse; and
    a controller module in communication with said first and second sensing devices and a hydraulic brake circuit, said controller module being configured to command line pressure in the hydraulic brake circuit to increase or decrease by an amount that is equal in magnitude and substantially opposite to the pressure pulse caused by the surface variation of the brake system corner component to substantially minimize brake pulsation feedback.

12. The brake system of claim 11 wherein said first sensing device is a pressure transducer.

13. The brake system of claim 11 wherein said second sensing device is a wheel speed sensor.

14. A method of minimizing a brake pulsation feedback caused by a surface variation of a brake system component in a brake system including a hydraulic brake circuit, said method comprising the steps of:
  determining the magnitude and phase of a pressure pulse caused by the surface variation; and
  commanding a line pressure in the hydraulic circuit to increase or decrease an amount equal in magnitude and substantially opposite to the pressure pulse to substantially minimize brake pulsation feedback.

15. The method of claim 14 wherein a pressure transducer is used to detect the magnitude and phase of the pressure pulse.

16. The method of claim 14 wherein a wheel speed sensor is used to detect the phase of the pressure pulse.

17. The method of clam 15 wherein a controller module is used for increasing or decreasing line pressure in the hydraulic brake circuit in response to receiving the magnitude and phase of the pressure pulse.

18. The method of claim 17 wherein the step of increasing line pressure further comprises actuating at least one valve associated with the controller to allow hydraulic fluid into the hydraulic brake circuit.

19. The method of claim 17 wherein the step of decreasing line pressure further comprises the step of actuating at least one valve associated with the controller to release hydraulic fluid from the hydraulic brake circuit.

20. The method of claim 14 wherein the step of increasing or decreasing line pressure occurs in response to pressure pulses occurring after a first pressure pulse.

* * * * *